G. ZIMMERMAN & G. BEATTY.
GLASS-TOOL.

No. 191,793.   Patented June 12, 1877.

Witnesses:
Colborne Brookes
Perry B. Turpin

Inventors:
George Zimmerman
George Beatty
By R. S. & A. P. Lacey
attorneys

UNITED STATES PATENT OFFICE.

GEORGE ZIMMERMAN AND GEORGE BEATTY, OF STEUBENVILLE, OHIO.

IMPROVEMENT IN GLASS-TOOLS.

Specification forming part of Letters Patent No. 191,793, dated June 12, 1877; application filed May 10, 1877.

*To all whom it may concern:*

Be it known that we, GEORGE ZIMMERMAN and GEORGE BEATTY, of Steubenville, in the county of Jefferson, and State of Ohio, have invented certain new and useful Improvements in Glass-Tools; and we do hereby declare that the following is a full, clear, and exact description thereof, which will enable others skilled in the art to which it pertains to make and use the same, reference being had to the accompanying drawing, and to the letters of reference marked thereon, which form a part of this specification.

Our invention relates to improvements in glass-tools; and has for its object to provide a fork, which, to handle efficiently, requires much less skill and practice than is required for, and by which the glass article may be deposited in the annealing-oven with less liability of being injured than can be done by the ordinary forks. It consists in a swinging or rotating prong combined with the prongs of the ordinary glass-fork, and adapted to support the weight of and deposit the article in the annealing-oven without jerking, jarring, or shoving movements to get it clear of the fork.

Figure 1:
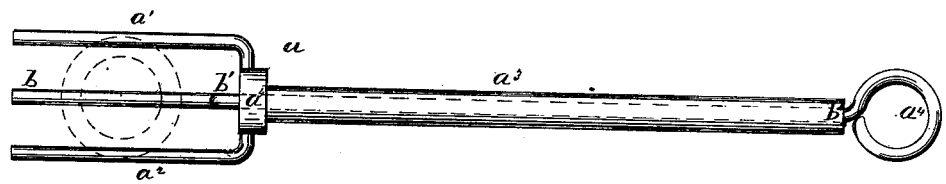
Figure 2:
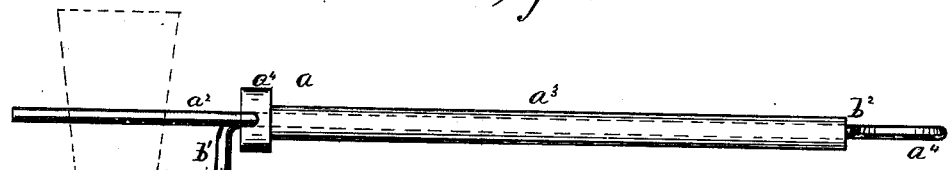
Figure 3:
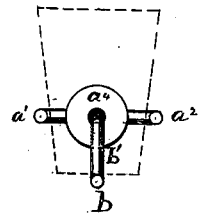
Figure 4:
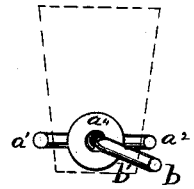

In the drawing, Figure 1 is a top or plan view, Fig. 2 a side view, and Figs. 3 and 4 detail views, of our invention.

$a$ is the fork, having the prongs $a^1$ $a^2$ of ordinary construction. The handle $a^3$ is, by preference, made hollow, as indicated, for the reception of the handle or shaft of the rotating prong $b$.

$b$ is the swinging or rotating prong, made L shape, as shown, with the upper end of the part $b^1$ secured centrally between the prongs $a^1$ $a^2$ with capability of a rotating movement. It is, by preference, provided with a shaft or handle, $b^2$, which passes through the hollow handle $a^3$, as shown.

The handle $b^2$ may be dispensed with, and the handle $a^3$ made solid, in which case the upper end of the part $b^1$ of the prong $b$ would be pivoted on a suitable pin on the end $a^4$ of the handle $a$.

The device is used by passing the prong $b$ under the article, as indicated in Figs. 1, 2, and 3. The article, when carried, rests against one or the other of the prongs $a^1$ $a^2$, as indicated in Fig. 3, and its weight is supported by the prong $b$.

The article is deposited in the oven by resting the prong $b$ on the floor and gently pressing down on the handle $a^3$, which causes the prong to turn sidewise and from under the article, as indicated in Fig. 4; or, when the device is constructed with the handle $a^3$ hollow, and with the shaft or handle $b^1$, as above described, the prong $b$ may be turned from under the article by turning the shaft or handle $b^1$ by the projecting end $b^3$.

The article, after it has been conveyed into the oven, is deposited with less care than is required to be exercised in the use of the ordinary fork. The prong $b$ first touches the floor of the oven and receives and relieves any jar or shock that may be given by a hurried movement.

The article is not moved after the prong $b$ touches the oven-floor, except that it makes the slight vertical descent off the prong onto the floor.

Having described our invention, what we claim, and desire to secure by Letters Patent, is—

The combination, with a glass fork, $a$, of a rotating prong, $b$, constructed and arranged substantially as and for the purpose set forth.

In testimony that we claim the foregoing as our own we affix our signatures in presence of two witnesses.

GEORGE ZIMMERMAN.
GEORGE BEATTY.

Witnesses:
JOSEPH B. DOYLE,
J. CONN.